United States Patent
Guo et al.

(10) Patent No.: US 11,536,495 B2
(45) Date of Patent: Dec. 27, 2022

(54) VRV OIL RETURN CONTROL METHOD AND SYSTEM

(71) Applicants: QINGDAO HAIER AIR-CONDITIONING ELECTRONIC CO., LTD., Qingdao (CN); HAIER SMART HOME CO., LTD., Qingdao (CN)

(72) Inventors: Defang Guo, Qingdao (CN); Baitian Zhuo, Qingdao (CN); Bin Shi, Qingdao (CN); Shaojiang Cheng, Qingdao (CN); Ruigang Zhang, Qingdao (CN); Jun Wang, Qingdao (CN)

(73) Assignees: QINGDAO HAIER AIR-CONDITIONING ELECTRONIC CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 202 days.

(21) Appl. No.: 16/966,876

(22) PCT Filed: Jan. 28, 2019

(86) PCT No.: PCT/CN2019/073348
§ 371 (c)(1),
(2) Date: Jul. 31, 2020

(87) PCT Pub. No.: WO2019/149163
PCT Pub. Date: Aug. 8, 2019

(65) Prior Publication Data
US 2021/0041148 A1 Feb. 11, 2021

(30) Foreign Application Priority Data
Feb. 2, 2018 (CN) .......................... 201810107557.3

(51) Int. Cl.
*F25B 31/00* (2006.01)
*F25B 49/02* (2006.01)
*F24F 1/0003* (2019.01)

(52) U.S. Cl.
CPC .......... *F25B 31/004* (2013.01); *F25B 49/022* (2013.01); *F24F 1/0003* (2013.01);
(Continued)

(58) Field of Classification Search
CPC ................. F25B 31/002; F25B 31/004; F25B 2313/02331; F25B 2313/02334;
(Continued)

(56) References Cited

FOREIGN PATENT DOCUMENTS

| CN | 102331103 | 1/2012 |
|---|---|---|
| CN | 102645057 | 8/2012 |

(Continued)

*Primary Examiner* — Jerry-Daryl Fletcher
*Assistant Examiner* — Daniel C Comings
(74) *Attorney, Agent, or Firm* — Jiwen Chen; Joywin IP Law PLLC

(57) ABSTRACT

An oil return control method for a multi-split air conditioner and a system accomplishing the same includes: calculating an average exhaust pressure within an oil return period $Pd\_AVG$; determining whether the average exhaust pressure $Pd\_AVG \geq$ the set threshold $Pd_{threshold}$; if $Pd\_AVG \geq Pd_{threshold}$, maintaining the multi-split air conditioner working in heating mode to ensure an acceptable oil return performance without affecting the air conditioning effect of indoor unit in heating mode; if $Pd\_AVG < Pd_{threshold}$, switching the multi-split air conditioner to cooling mode, stopping a fan within those power-on indoor units and entering into a cooling oil return process and switching the multi-split air conditioner back to heating mode until the cooling oil return process ends.

9 Claims, 3 Drawing Sheets

(52) U.S. Cl.
CPC ... *F25B 2500/19* (2013.01); *F25B 2600/2513* (2013.01); *F25B 2700/03* (2013.01)

(58) Field of Classification Search
CPC .......... F25B 2600/025; F25B 2600/112; F25B 2700/09; F25B 2700/171
See application file for complete search history.

(56) References Cited

FOREIGN PATENT DOCUMENTS

| | | | | |
|---|---|---|---|---|
| CN | 104344621 | * | 2/2015 | ............ F25B 31/002 |
| CN | 105157294 | | 12/2015 | |
| CN | 106369879 | | 2/2017 | |
| CN | 107166647 | | 9/2017 | |
| CN | 107631519 | | 1/2018 | |
| EP | 3006845 | | 4/2016 | |
| KR | 20060056511 | | 5/2006 | |
| WO | WO2007029180 | | 3/2007 | |

* cited by examiner

VRV OIL RETURN CONTROL METHOD AND SYSTEM

This is a U.S. national stage application of PCT Application No. PCT/CN2019/073348 under 35 U.S.C. 371, filed Jan. 28, 2019 in Chinese, claiming priority of Chinese Application No. 201810107557.3, filed Feb. 2, 2018, all of which are hereby incorporated by reference.

TECHNICAL FIELD

The invention belongs to the technical field of air conditioning, and in particular relates to an oil return control method for a multi-split type air conditioner and a system for accomplishing the same.

BACKGROUND TECHNOLOGY

A multi-split air conditioner usually connects up several indoor units to a single outdoor unit. While the system is running, some oil will leave a compressor within the outdoor unit and travel into each indoor unit of the system. In heating mode, the opening degrees of expansion valves installed on those shut-off indoor units are relatively small in order to optimize the air conditioning effect of those power-on indoor units. The small opening degree only allows the refrigerant to return to the compressor but the oil will be left and not return to the compressor properly. When this happens repeatedly, a large amount of oil may accumulate in the pipeline of those shut-off indoor units and cause a lack of oil in compressor and damage.

In order to enable that part of oil to return to the compressor as required, the multi-split air conditioner usually performs oil return operation at regular intervals, within which the system is switched to cooling mode and the oil is brought back to the compressor through the liquid refrigerant flowing. But when those indoor units being switched to cooling mode, it will lower the room temperature sharply which significantly affects the heating effect.

SUMMARY OF THE INVENTION

The invention provides an oil return control method for a multi-split type air conditioner, aiming at reducing the influence of oil return control on the heating effect of air conditioning.

In order to solve the above technical problems, the present invention is implemented by the following technical solutions:

An oil return control method for a multi-split air conditioner, the multi-split air conditioner including: an outdoor unit; a plurality of indoor units; and expansion valves disposed on a connecting pipe between each of the indoor unit and the outdoor unit; as the multi-split air conditioner working in heating mode, the method includes:

(1) calculating an average exhaust pressure within an oil return period $Pd\_AVG$:

$$Pd\_AVG = \frac{\sum_{i=1}^{Count}(Ratio_i * Pd_i)}{Count * RatioX}$$

wherein $RatioX$ is a set load rate, $Count$ is either the number of times that exhaust pressure of the compressor is collected within the oil return period or the number of times power-on indoor unit load rate is calculated within the oil return period; $Pd_i$ is the exhaust pressure of the compressor collected for the $i_{th}$ time within the oil return period; $Ratio_i$ is the power-on indoor unit load rate calculated for the $i_{th}$ time within an oil return period, $Ratio_i = On\_HP_i/ALL\_HP$, $On\_HP_i$ is a sum of capacities of all power-on indoor units when calculating $Ratio_i$; and $ALL\_HP$ is a sum of capacities of all indoor units;

(2) determining whether the average exhaust pressure $Pd\_AVG \geq$ a set threshold $Pd_{threshold}$;

if $Pd\_AVG \geq Pd_{threshold}$, maintaining the multi-split air conditioner working in heating mode and entering into a heating oil return process;

if $Pd\_AVG < Pd_{threshold}$, enabling the multi-split air conditioner to work in cooling mode, stopping a fan within those power-on indoor units and entering into a cooling oil return process, enabling the multi-split air conditioner to work in the heating mode again until the cooling oil return process ends.

Further, when $Pd\_AVG < Pd_{threshold}$, before enabling the multi-split air conditioner to work in cooling mode, the method includes:

determining whether a current running frequency of the compressor $f <$ a predetermined upper frequency limit $fmax$;

if $f \geq$ the predetermined upper frequency limit $fmax$, enabling the multi-split air conditioner to work in cooling mode, stopping a fan within those power-on indoor units and entering into the cooling oil return process;

if $f <$ the predetermined upper frequency limit $fmax$, maintaining the multi-split air conditioner working in heating mode and increasing the running frequency of the compressor to the upper frequency limit $fmax$;

determining whether an oil level of the compressor $\geq$ a set oil level;

if the oil level of the compressor $<$ the set oil level, enabling the multi-split air conditioner to work in cooling mode, stopping a fan within those power-on indoor units and entering into the cooling oil return process;

if the oil level of the compressor $\geq$ the set oil level, reducing the frequency of the compressor to the frequency f.

Further, when the heating oil return process beginning, the method further includes: obtaining a current exhaust pressure of the compressor; determining whether the current exhaust pressure is greater than a first set pressure value; if the current exhaust pressure is greater than the first set pressure value, the time that the heating oil return process lasts is a first set time; if the current exhaust pressure is not greater than the first set pressure value, the time that the heating oil return process lasts is a second set time; wherein, the first set time < the second set time.

Further, when the heating oil return process beginning, the method further includes: obtaining a current exhaust pressure of the compressor; determining whether the current exhaust pressure is greater than a first set pressure value; if the current exhaust pressure is greater than the first set pressure value, the time that the heating oil return process lasts is a first set time; if the current exhaust pressure is not greater than the first set pressure value, the time that the heating oil return process lasts is a second set time; wherein, the first set time < the second set time.

Further, in the heating oil return process, the method further includes: increasing the opening degree of those expansion valves on shut-off indoor units or increasing the frequency of the compressor; restoring the opening degree of those expansion valves on shut-off indoor units or the frequency of the compressor to the state before entering into the heating oil return process when the heating oil return process ending.

Further, when the cooling oil return process beginning, the method further includes: obtaining a current exhaust pressure of the compressor; determining whether the current exhaust pressure is greater than a second set pressure value; if the current exhaust pressure is greater than the second set pressure value, the time that the cooling oil return process lasts is a third set time; if the current exhaust pressure is not greater than the second set pressure value, the time that the cooling oil return process lasts is a fourth set time; wherein the third set time<the fourth set time.

Further, in the cooling oil return process, the method further includes: increasing the running frequency of the compressor to an upper frequency limit; detecting an oil level of the compressor and determining whether the oil level of the compressor≥a set the oil level; if the oil level of the compressor≥the set the oil level, ending the cooling oil return process.

Further, in the cooling oil return process, the method further includes: reducing the opening degree of those electronic expansion valves on power-on indoor units and increasing the opening degree of those electronic expansion valves on shut-off indoor units.

Preferably, reducing the opening degree of those electronic expansion valves on power-on indoor units to half of it and increasing the opening degree of those electronic expansion valves on shut-off indoor units to its full opening degree.

Another aspect of the present invention is to provide an oil return control system for a multi-split air conditioner, the multi-split air conditioner including: an outdoor unit; a plurality of indoor units; and expansion valves disposed on a connecting pipe between each of the indoor unit and the outdoor unit; the system includes: an average exhaust pressure calculation module configured to calculate an average exhaust pressure within an oil return period Pd_AVG:

$$Pd\_AVG = \frac{\sum_{i=1}^{Count}(Ratio_i * Pd_i)}{Count * RatioX}$$

wherein RatioX is a set load rate; Count is either the number of times that exhaust pressure of the compressor is collected within one oil return period or the number of times power-on indoor unit load rate is calculated within one oil return period; $Pd_i$ is the exhaust pressure of the compressor collected for the $i_{th}$ time within an oil return period; $Ratio_i$ is the power-on indoor unit load rate calculated for the $i_{th}$ time within an oil return period; $Ratio_i$=On_$HP_i$/ALL_HP, wherein On_$HP_i$ is a sum of capacities, in housepower, of all power-on indoor units when calculating $Ratio_i$; and ALL_HP is a sum of capacities of all indoor units; a determination module configured to determine whether the Pd_AVG≥a set threshold $Pd_{threshold}$; a heating oil return module configured to maintain the multi-split air conditioner working in heating mode and enable it enter to a heating oil return process when Pd_AVG≥the set threshold $Pd_{threshold}$; and a cooling oil return module configured to enable the multi-split air conditioner to work in cooling mode and enter to a cooling oil return process when Pd_AVG<the set threshold $Pd_{threshold}$; to control the fan within those power-on indoor units to stop and to enable the multi-split air conditioner to switch back to heating mode when the cooling oil return process ending.

Compared with the prior art, the advantages and positive effects of the present invention are: the oil return control method for a multi-split air conditioner and the system accomplishing the same, which comprises: calculating an average exhaust pressure within an oil return period Pd_AVG; determining whether the average exhaust pressure Pd_AVG≥the set threshold $Pd_{threshold}$; if Pd_AVG≥ $Pd_{threshold}$, maintaining the multi-split air conditioner working in heating mode to ensure an acceptable oil return performance without affecting the air conditioning effect of indoor unit in heating mode; if Pd_AVG<$Pd_{threshold}$, switching the multi-split air conditioner to cooling mode, stopping a fan within those power-on indoor units and entering into a cooling oil return process and switching the multi-split air conditioner back to heating mode until the cooling oil return process ends. Hence, according to the oil return control disclosed by this embodiment, if it requires improving oil return performance, the multi-split air conditioner working in heating mode is only being switched to cooling mode if Pd_AVG<$Pd_{threshold}$ and the fan within those power-on indoor units is being shut off to minimize the fluctuation of room temperature; the heating mode operation could be maintained if Pd_AVG≥$Pd_{threshold}$, oil return requirement and heating requirement could be satisfied at the same time to avoid affecting normal air conditioning operation significantly so as to solve the problem in the prior art.

Advantages and features of the present disclosure will be more clearly understood from exemplary embodiments described below with reference to the accompanying drawings.

DETAILED DESCRIPTION OF THE EMBODIMENTS

The present invention will be further described in detail below with reference to the accompanying drawings and embodiments.

Figure 1:
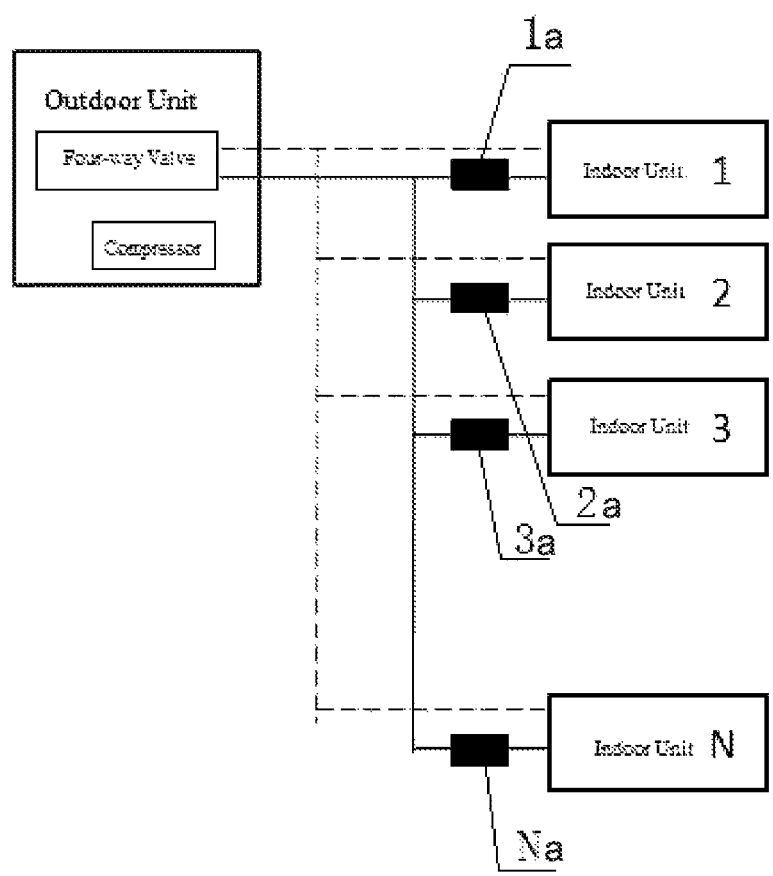
FIG. 1 is a block diagram showing a multi-split air conditioner.

A multi-split air conditioner connects up an outdoor unit and a plurality of indoor units, an expansion valve is disposed on a connecting pipe between each of the indoor unit and the outdoor unit, preferably on a liquid pipe of each of the indoor unit to adjust the velocity of refrigerant flowing thereinto. Each liquid pipe of the indoor unit is connected to a liquid pipe of the outdoor unit. For example, as shown in FIG. 1, an expansion valve 1a is disposed on the liquid pipe of the indoor unit 1, an expansion valve 2a is disposed on the liquid pipe of the indoor unit 2, an expansion valve 3a is disposed on the liquid pipe of the indoor unit 3 . . . , and an expansion valve Na is disposed on the liquid pipe of the indoor unit N. The outdoor unit includes a compressor and a four-way valve to control the direction of refrigerant cycle so as to change the operation of the multi-split air conditioner between cooling mode and heating mode.

Figure 2:
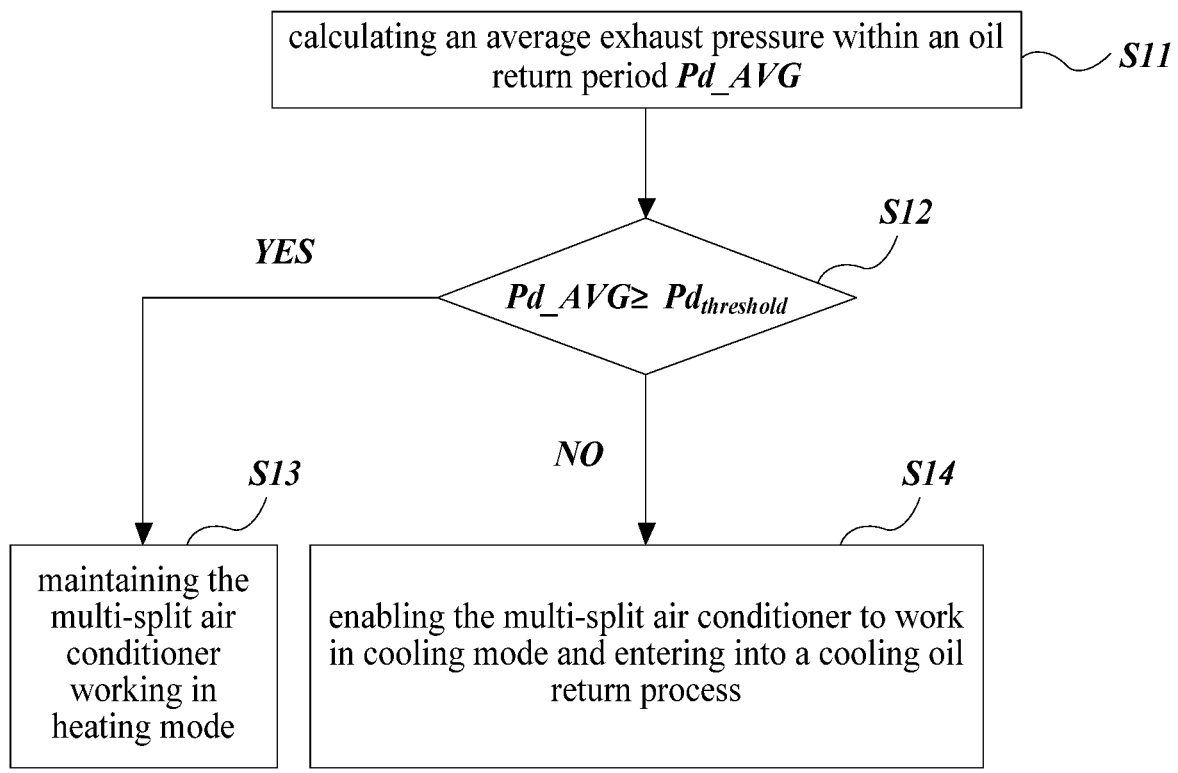
FIG. 2 is a flow chart showing an oil return control method for a multi-split air conditioner according to an embodiment of the present invention.

An oil return control method disclosed by this embodiment as the multi-split type air conditioner working in heating mode mainly includes the following steps, as shown in FIG. 2.

Step S11: When reaching an oil return time, calculating an average exhaust pressure within an oil return period Pd_AVG;

$$Pd\_AVG = \frac{\sum_{i=1}^{Count}(Ratio_i * Pd_i)}{Count * RatioX}$$

wherein,

RatioX is a set load rate.

Count is either the number of times that exhaust pressure of the compressor is collected within the oil return period or the number of times power-on indoor unit load rate is calculated within the oil return period. In each oil return period, a plurality of exhaust pressure of the compressor is repeatedly obtained and a plurality of power-on indoor unit load rate is repeatedly calculated at regular intervals.

$Pd_i$ is the exhaust pressure of the compressor collected for the $i_{th}$ time within the oil return period;

$Ratio_i$ is the power-on indoor unit load rate calculated for the $i_{th}$ time within an oil return period.

$Ratio_i = On\_HP_i/ALL\_HP$, wherein $On\_HP_i$ (in housepower) is a sum of capacities of all power-on indoor units when calculating $Ratio_i$; and ALL_HP is a sum of capacities of all indoor units.

In each oil return period, repeatedly an exhaust pressure of the compressor is collected, a sum of capacities of all power-on indoor units is obtained and a power-on indoor unit load rate is calculated at same regular intervals. As an example, in each oil return period, the exhaust pressure is repeatedly collected for Court times marked as ($Pd_1$, $Pd_2$, $Pd_3$, ..., $Pd_{count}$), the sum of capacities of all power-on indoor units is repeatedly collected for Court times marked as ($On\_HP_1$, $On\_HP_2$, $On\_HP_3$, ..., $On\_HP_{Count}$) and the power-on indoor unit load rate $Ratio_i$ is repeatedly calculated for Court times marked as ($Ratio_1$, $Ratio_2$, $Ratio_3$, ..., $Ratio_{count}$).

The power-on indoor unit load rate calculated for the first time: $Ratio_1 = On\_HP_1/ALL\_HP$ The power-on indoor unit load rate calculated for the second time:

$Ratio_2 = On\_HP_2/ALL\_HP$;

The power-on indoor unit load rate calculated for the third time:

$Ratio_3 = On\_HP_3/ALL\_HP$; ... ;

The power-on indoor unit load rate calculated for the Court time:

$Ratio_{Count} = On\_HP_{Count}/ALL\_HP$.

Since the indoor units could be powered on at any time, each calculation of the power-on indoor unit load rate should update the sum of capacities of all power-on indoor units to improve accuracy.

For example, an oil return period could be set as 4 hours. During the oil return period, every 10 minutes, the exhaust pressure is obtained once, the sum of capacities of all power-on indoor units is obtained once, and the power-on indoor unit load rate is calculated once; that is to say during the oil return period, the exhaust pressure is repeatedly collected for 24 times marked as ($Pd_1$, $Pd_2$, $Pd_3$, ..., $Pd_{24}$), the sum of capacities of all power-on indoor units is repeatedly collected for 24 times marked as ($On\_HP_1$, $On\_HP_{\_2}$, $On\_HP_3$, ..., $On\_HP_{24}$) and the power-on indoor unit load rate $Ratio_i$ is repeatedly calculated for 24 times marked as ($Ratio_1$, $Ratio_2$, $Ratio_3$, ..., $Ratio_{24}$).

Assume that the oil return period is 4 hours and starts from 0:00, the beginning of the day, the oil return time is respectively 4:00, 8:00, 12:00, 16:00, 20:00, and 24:00. When reaching each oil return time the average exhaust pressure within the previous oil return period Pd_AVG is calculated. For example, at 4:00 it is an oil return time, the average exhaust pressure between 0:00 to 4:00 is calculated; or at 8:00 it is an oil return time, the average exhaust pressure between 4:00 to 8:00 is calculated.

A pressure value, which is related to the power-on indoor unit load rate, is required to determine whether current status satisfies oil return requirement in heating mode, wherein Pd_AVG could $$be\ conversed\ to\ \frac{\sum_{i=1}^{Count}(Ratio_i * Pd_i)}{Count} = RatioX * Pd_{threshold}.$$

If $Pd\_AVG \geq Pd_{threshold}$, it could be regarded that the current status satisfies the oil return requirement in heating mode and lack of oil does not happen, wherein $Pd_{threshold}$ is experimentally determined with a preset RatioX, as an example, setting RatioX=0.5 and observing the oil return performance under varied pressure, and finally choosing a proper $Pd_{threshold}$ under a certain pressure at which the oil return requirement in heating mode could be satisfied.

Since a multi-split air conditioner system includes a plurality of indoor units with different capacities and the power-on indoor unit load rate may change due to how many indoor units are powered on, it requires calculating the average exhaust pressure Pd_AVG and comparing it with the set threshold $Pd_{threshold}$.

Step S12: determining whether the average exhaust pressure $Pd\_AVG \geq$ the set threshold $Pd_{threshold}$.

The oil return performance is related to the exhaust pressure of the compressor: the higher the exhaust pressure the more lucrative oil could be brought out from shut-off indoor units through either gaseous refrigerant or liquid refrigerant. But under the same exhaust pressure, the oil return effect through liquid refrigerant is better than that through gaseous refrigerant. Hence, for a multi-split air conditioner, oil return performance is better when the multi-split air conditioner working in cooling mode than in heating mode.

It can be seen that if the exhaust pressure is high enough an acceptable oil return performance still could be achieved in heating mode and those power-on indoor units also could operate in heating mode not been affected.

If $Pd\_AVG \geq Pd_{threshold}$, performing Step S13;

If $Pd\_AVG < Pd_{threshold}$, performing Step S14.

Step S13: Maintaining the multi-split air conditioner working in heating mode.

Since when Pd_AVG≥Pd threshold the average exhaust pressure is comparatively high, the multi-split air conditioner still has an acceptable oil return performance in heating mode and no lack of oil of the compressor happens; the multi-split air conditioner maintains working in heating mode and enters into a heating oil return process, during which an acceptable air conditioning effect could be kept.

In the heating oil return process, the multi-split air conditioner could be operated in a same way as being operated in normal heating mode.

In the heating oil return process, two methods also could be used to speed up oil return: one is to increase the opening degree of those expansion valves on shut-off indoor units and the other one is to increase the frequency of the compressor. When the heating oil return process ends, the opening degree of expansion valve or the frequency of the compressor restores to the state before entering into the heating oil return process.

Since how long the heating oil return process lasts is related to the exhaust pressure of the compressor when entering into the heating oil return process, at the time when the heating oil return process starts the method further includes:

Step S13-11: obtaining a current exhaust pressure of the compressor;

Step S13-12: determining whether the current exhaust pressure is greater than a first set pressure value;

If the current exhaust pressure is greater than the first set pressure value, the time of the heating oil return process is a first set time.

If the current exhaust pressure is not greater than the first set pressure value, the time of the heating oil return process is a second set time; wherein, the first set time<the second set time.

When heating oil return process reaches the first set time or the second set time, the heating oil return process ends, and the normal heating is resumed.

The time of the heating oil return process is set according to the exhaust pressure obtained when entering into the heating oil return process not only ensures the oil return running time long enough, thereby achieving a better oil returning performance, but also avoiding the oil return running time too long to affect normal heating operation.

For example, the first set pressure value is 28 kg, the first set time is 15 minutes, and the second set time is 20 minutes. If the current exhaust pressure>28 kg, the heating oil return process lasts 15 minutes; if the current exhaust pressure≤28 kg, the heating oil return process lasts 20 minutes; in this way the time of the heating oil return process not only ensures the oil return running time long enough, thereby achieving a better oil returning performance, but also avoiding the oil return running time too long to affect normal heating operation.

Alternatively, how long the heating oil return process lasts could be determined according to an oil level of the compressor. Specifically, in the heating oil return process, obtaining an oil level of the compressor, determining whether the oil level≥a set oil level; if the oil level<a set oil level, keeping the heating oil return process lasting; if the oil level≥a set oil level, ending the heating oil return process. If the compressor oil level≥the set oil level the heating oil return process could be ended so as to prevent the time of the heating oil return process too long.

Step S14: Enabling the multi-split air conditioner to work in the cooling mode (the four-way valve is actuated to reverse the refrigerant circulation direction); stopping a fan within those power-on indoor units and entering into a cooling oil return process; enabling the multi-split air conditioner to work in the heating mode again until the cooling oil return process ends.

Since when $Pd\_AVG<Pd_{threshold}$ the average exhaust pressure is comparatively low as the multi-split air conditioner working in heating mode, the oil return performance of the multi-split air conditioner worsens; in order to improve the oil return performance to meet the oil return requirement, it is preferably to enable the multi-split air conditioner to work in cooling mode temporarily.

The oil return control method disclosed by this embodiment, which includes: calculating an average exhaust pressure within an oil return period Pd_AVG; determining whether the average exhaust pressure $Pd\_AVG \geq a$ set threshold $Pd_{threshold}$; if $Pd\_AVG \geq Pd_{threshold}$, maintaining the multi-split air conditioner working in heating mode to ensure an acceptable oil return performance without affecting the air conditioning effect of indoor unit in heating mode; if $Pd\_AVG<Pd_{threshold}$, switching the multi-split air conditioner to cooling mode, stopping a fan within those power-on indoor units and entering into a cooling oil return process and switching back to heating mode until the cooling oil return process ends. Hence, according to the oil return control method disclosed by this embodiment, if it requires oil return operation, heating mode is only switched to cooling mode if $Pd\_AVG<Pd_{threshold}$ and the fan within those power-on indoor units is being shut off to minimize the fluctuation of room temperature; the heating mode could be maintained if $Pd\_AVG \geq Pd_{threshold}$, oil return operation and heat operation could be achieved at the same time to avoid affecting normal air conditioning operation so as to solve the problem that oil return operation significantly affects the air conditioning heating performance in the prior art.

The oil return control method disclosed by this embodiment, within which whether or not to switch the multi-split air conditioner to cooling mode is determined according to the calculated average exhaust pressure, could ensure air conditioning heating effect under the premise of an acceptable oil return performance so as to solve the problem that oil return operation significantly affects the air conditioning heating performance in the prior art.

Figure 3:
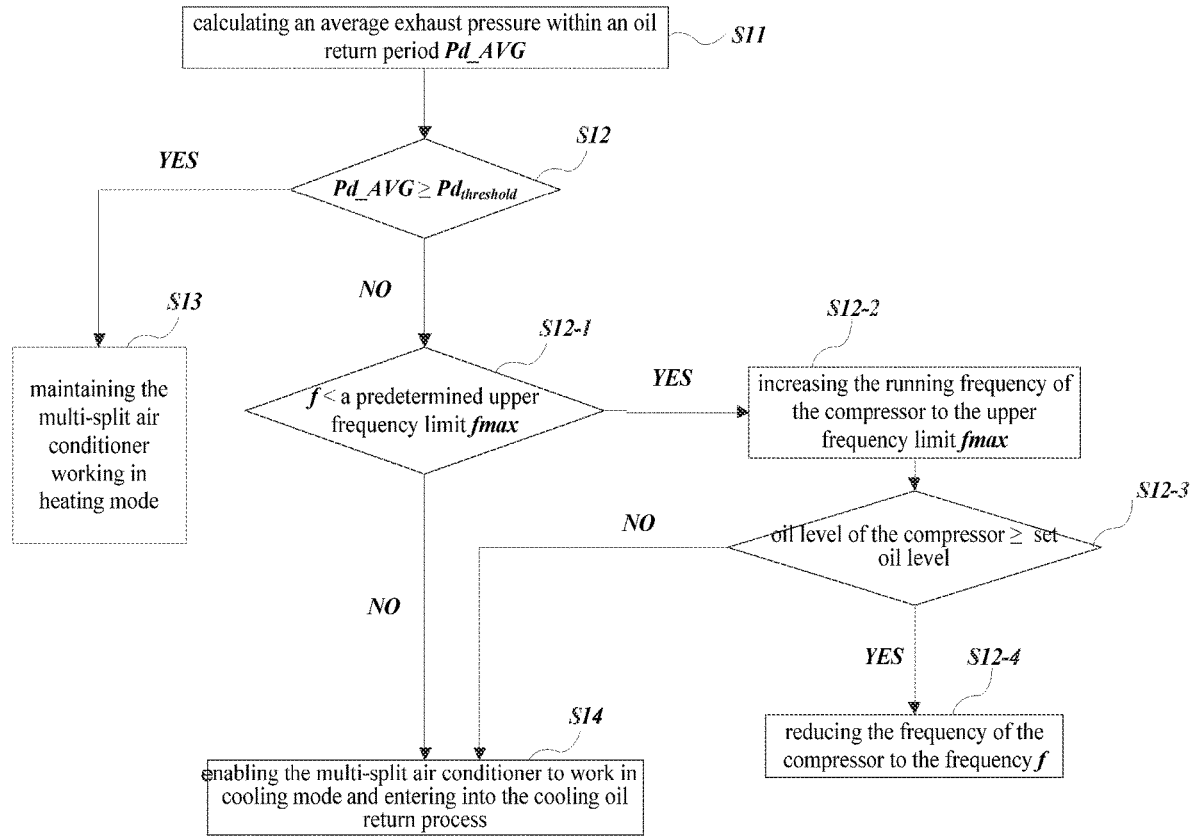
FIG. 3 is a flow chart showing another oil return control method for a multi-split air conditioner according to another embodiment of the present invention.

When $Pd\_AVG<Pd_{threshold}$, the method further includes the following steps before switching from heating mode to cooling mode, as shown in FIG. 3.

Step S12-1: Obtaining a current running frequency of the compressor f and determine whether the current running frequency of the compressor f<a predetermined upper frequency limit fmax.

If f≥the predetermined upper frequency limit fmax, it indicates that the current compressor frequency has reached its upper limit and could not increase further; then performing Step S14, switching the multi-split air conditioner to cooling mode; stopping a fan within power-on indoor units and entering into the cooling oil return process.

If f<the predetermined upper frequency limit fmax, it indicates that the current compressor frequency has not reached its upper limit, and then performing Step S12-2.

Step S12-2: maintaining the multi-split air conditioner working in heating mode and increasing the running frequency of the compressor to the upper frequency limit fmax. As the compressor working at a higher frequency, the flow of refrigerant could speed up and the oil return could be accelerated.

Step S12-3: determining whether an oil level of the compressor≥a set oil level after a set time (for example, 5 minutes) which starts when the compressor running at the upper frequency limit fmax.

If the oil level of the compressor<the set oil level, it indicates that the current oil level of the compressor has not reached the set oil level so the effect by increasing the running frequency of the compressor could not meet the oil return requirement, then performing Step S14, switching the multi-split air conditioner to cooling mode; stopping a fan within those power-on indoor units and entering into the cooling oil return process.

If the oil level of the compressor≥the set oil level, it indicates that the oil level of the compressor has reached the set oil level so the effect by only increasing the running frequency of the compressor could meet the oil return requirement, then performing Step S12-4, reducing the frequency of the compressor to the frequency f and the heating oil return process ends and the multi-split air conditioner restores to normal heating operation.

Since how long the cooling oil return process lasts is related to the exhaust pressure of the compressor when entering into the cooling oil return process, when the cooling oil return process starting the method further includes:

Step S11: obtaining a current exhaust pressure of the compressor;

Step S12: determining whether the current exhaust pressure is greater than a second set pressure value;

If the current exhaust pressure is greater than the second set pressure value, the time that the cooling oil return process lasts is a third set time.

If the current exhaust pressure is not greater than the second set pressure value, the time that the cooling oil return process lasts is a fourth set time; wherein, the third set time<the fourth set time.

When the cooling oil return process reaches the third set time or the fourth set time, the cooling oil return process ends and the normal heating operation is resumed.

The time that the cooling oil return process lasts is set according to the exhaust pressure obtained when entering into the cooling oil return process not only ensures the cooling oil return running time long enough, thereby achieving a better oil returning performance, but also avoiding the oil return running time too long to affect normal heating operation.

It is preferably set that the third set time<the fourth set time<the first set time<the second set time.

For example, the second set pressure value is 25 kg, the third set time is 5 minutes, and the second set time is 10 minutes. If the current exhaust pressure>25 kg, the cooling oil return process lasts 5 minutes; if the current exhaust pressure≤25 kg, the cooling oil return process lasts 10 minutes; in this way the preset time of the oil return process not only ensures it is long enough for oil return, thereby achieving a better oil returning performance, but also avoiding the oil return running time too long to affect normal heating operation.

Assume that the cooling oil return process lasts 10 minutes it could be from 4:00 to 4:10 or from 8:00 to 8:10

Alternatively how long the cooling oil return process lasts could be determined according to an oil level of the compressor. Specifically, in the cooling oil return process, the following steps are included:

Step S12-2: increasing the running frequency of the compressor to the upper frequency limit;

Step S12-3: detecting an oil level of the compressor and determining whether the oil level of the compressor≥the set the oil level;

If the oil level of the compressor<the set the oil level, return to S14;

If the oil level of the compressor≥the set the oil level, the cooling oil return process ends and enabling the multi-split air conditioner to be switched back to heating mode.

The operation of increase of the running frequency of the compressor to the upper frequency limit could enable the refrigerant flow to speed up to accelerate the oil return, so that a better oil return performance is achieved and the cooling oil return process is shortened to minimize the fluctuation of room temperature in cooling oil return process. When the oil level reaching the set oil level, the cooling oil return process ends.

In the cooling oil return process, in order to further reduce the influence on the room temperature, it is preferably to narrow down the opening degree of those electronic expansion valves on power-on indoor units to lower the amount of the refrigerant flowing thereinto and to increase the opening degree of those electronic expansion valves on shut-off indoor units to give rise to the amount of the refrigerant flowing into for removing as much as possible the lubricating oil in the shut-off units to improve oil return effect.

In the cooling oil return process, it is preferably to narrow down the opening degree of those electronic expansion valves to half of them in heating mode so as to not only ensure sufficient refrigerant flowing into power-on indoor units to bring the lubricating oil therein out but also reduce the influence on room temperature; and to increase the opening degree of those electronic expansion valve on shut-off indoor units to the full opening degree for removing as much as possible the lubricating oil therein to improve oil return performance.

An example is shown in the following description, wherein the total capacity of all indoor units is ALL_HP=10HP; when RatioX=0.5, $Pd_{threshold}$=27 kg; in each oil return period (4 hours), data is collected for eight times (every 30 minutes), the oil return control method comprises:

TABLE 1

| data is collected for eight times in an oil return period (0:00-4:00). | | | | | | | | |
|---|---|---|---|---|---|---|---|---|
| On_HP | 5 HP | 4 HP | 7 HP | 10 HP | 2 HP | 1 HP | 5 HP | 9 HP |
| Ratio | 0.5 | 0.4 | 0.7 | 1 | 0.2 | 0.1 | 0.5 | 0.9 |
| Pd(kg) | 27.5 | 28.3 | 24.3 | 23.8 | 27.6 | 28.1 | 25.8 | 24.4 |

(1) At 4:00, an oil return time is reached and an average exhaust pressure Pd_AVG is calculated:

$$Pd\_AVG=(0.5*27.5+0.4*28.3+0.7*24.3+1*23.8+ \\ 0.2*27.6+0.1*28.1+0.5*25.8+0.9*24.4)/ \\ (8*0.5)=27.3\ kg>27\ kg.$$

(2) Due to the $Pd\_AVG>Pd_{threshold}$, maintaining the multi-split air conditioner working in heating mode and keeping still the four-way valve, power-on indoor units operate in normal heating mode and the opening degree of those electronic expansion valves on those shut-off indoor units is increased to enter into the heating oil return process.

TABLE 2

| data is collected for eight times in an oil return period (4:00-8:00) | | | | | | | | |
|---|---|---|---|---|---|---|---|---|
| On_HP | 5 HP | 4 HP | 7 HP | 10 HP | 2 HP | 1 HP | 5 HP | 9 HP |
| Ratio | 0.5 | 0.4 | 0.7 | 1 | 0.2 | 0.1 | 0.5 | 0.9 |
| Pd(kg) | 26.5 | 24.4 | 24.7 | 22.6 | 23.8 | 28.0 | 24.7 | 25.1 |

(1) At 8:00, an oil return time is reached and an average exhaust pressure Pd_AVG is calculated:

$$Pd\_AVG=(0.5*26.5+0.4*24.4+0.7*24.7+1*22.6+ \\ 0.2*23.8+0.1*28.0+0.5*24.7+0.9*25.1)/ \\ (8*0.5)=26.4\ kg<27\ kg.$$

(2) Due to the $Pd\_AVG<Pd_{threshold}$, it requires improving oil return by running the multi-split air conditioner in cooling mode so the four-way valve being actuated to reverse the refrigerant cycle, power-on indoor units operate in normal cooling mode and the opening degree of electronic expansion valves on those shut-off indoor units is increased to enter into the cooling oil return process.

Figure 4:
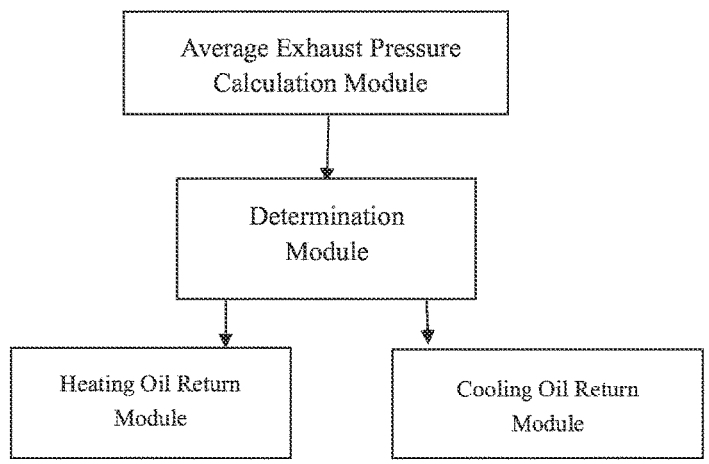
FIG. 4 is a block diagram showing an oil return control system for a multi-split air conditioner according to an embodiment of the present invention.

Based on the oil return control method disclosed by the above embodiment, an oil return control system for achieving the same is also provided. The multi-split air conditioner includes an outdoor unit and a plurality of indoor units, an expansion valve is disposed on a connecting pipe between each of the indoor unit and the outdoor unit. The oil return control system comprises: an average exhaust pressure calculation module, a determination module, a heating oil return module and a cooling oil return module, shown in FIG. 4.

The average exhaust pressure calculation module is configured to calculate an average exhaust pressure within an oil return period Pd_AVG:

$$Pd\_AVG = \frac{\sum_{i=1}^{Count}(Ratio_i * Pd_i)}{Count * RatioX}$$

wherein RatioX is a set load rate; Count is either the number of times that exhaust pressure of the compressor is collected within one oil return period or the number of times power-on indoor unit load rate is calculated within one oil return period; $Pd_i$ is the exhaust pressure of the compressor collected for the $i_{th}$ time within an oil return period; $Ratio_i$ is the power-on indoor unit load rate calculated for the $i_{th}$ time within an oil return period; $Ratio_i = On\_HP_i/ALL\_HP$, wherein $On\_HP_i$ is a sum of capacities, in housepower, of all power-on indoor units when calculating $Ratio_i$; and ALL_HP is a sum of capacities of all indoor units.

The determination module is configured to determine whether the Pd_AVG≥a set threshold $Pd_{threshold}$.

The heating oil return module is configured to maintain the multi-split air conditioner working in heating mode and enable it enter to a heating oil return process when Pd_AVG≥the set threshold $Pd_{threshold}$.

The cooling oil return module is configured to control the multi-split air conditioner working in cooling mode and enter to a cooling oil return process when Pd_AVG<the set threshold $Pd_{threshold}$, and in the meanwhile control the fan within those power-on indoor units to stop; the cooling oil return module is further configured to control the multi-split air conditioner switching back to heating mode when the cooling oil return process ending.

The working process of the multi-split air conditioner oil return control system could be referred to the detailed description of the method above and will not be described further herein.

The oil return control system disclosed by this embodiment, which includes: calculating an average exhaust pressure within an oil return period Pd_AVG; determining whether the average exhaust pressure Pd_AVG≥the set threshold $Pd_{threshold}$; if Pd_AVG≥$Pd_{threshold}$, maintaining the multi-split air conditioner working in heating mode to ensure an acceptable oil return performance without affecting the air conditioning effect of indoor unit in heating mode; if Pd_AVG<$Pd_{threshold}$, switching the multi-split air conditioner to cooling mode, stopping a fan within those power-on indoor units and entering into a cooling oil return process and switching the multi-split air conditioner back to heating mode until the cooling oil return process ends.

Hence, according to the oil return control disclosed by this embodiment, if it requires improving oil return performance, the multi-split air conditioner working in heating mode is only being switched to cooling mode if Pd_AVG<$Pd_{threshold}$ and the fan within those power-on indoor units is being shut off to minimize the fluctuation of room temperature; the heating mode operation could be maintained if Pd_AVG≥$Pd_{threshold}$, oil return requirement and heating requirement could be satisfied at the same time to avoid affecting normal air conditioning operation significantly so as to solve the problem in the prior art.

The above embodiments are only used to illustrate the technical solutions of the present invention, and are not limited thereto; although the present invention has been described in detail with reference to the foregoing embodiments, those skilled in the art can still The technical solutions are described as being modified, or equivalents are replaced by some of the technical features; and such modifications or substitutions do not depart from the spirit and scope of the technical solutions claimed in the present invention.

The invention claimed is:

1. An oil return control method for a multi-split air conditioner, the multi-split air conditioner including:
   an outdoor unit;
   a plurality of indoor units;
   and expansion valves respectively disposed on connecting pipes between each of the indoor units and the outdoor unit;
   wherein the method includes:
   (1) calculating an average exhaust pressure within an oil return period Pd_AVG $$Pd\_AVG = \frac{\sum_{i=1}^{Count}(Ratio_i * Pd_i)}{Count * RatioX}$$

wherein RatioX is a set load rate, Count is either the number of times that exhaust pressure of a compressor is collected within the oil return period or the number of times power-on indoor unit load rate is calculated within the oil return period; $Pd_i$ is the exhaust pressure of the compressor collected for the $i_{th}$ time within the oil return period; $Ratio_i$ is the power-on indoor unit load rate calculated for the $i_{th}$ time within an oil return period,
   $Ratio_i = On\_Hp_i/ALL\_HP$, $On\_HP_i$ is a sum of capacities of all power-on indoor units when calculating $Ratio_i$; and ALL_HP is a sum of capacities of all indoor units;
   (2) determining whether the average exhaust pressure Pd_AVG is greater than or equal to a set threshold $Pd_{threshold}$;
   if Pd_AVG is greater than or equal to $Pd_{threshold}$, maintaining the multi-split air conditioner working in heating mode and entering into a heating oil return process; if Pd_AVG is less than $Pd_{threshold}$, activating the multi-split air conditioner to work in cooling mode, stopping a fan within those power-on indoor units and entering into a cooling oil return process, activating the multi-split air conditioner to work in the heating mode again until the cooling oil return process ends.

2. The method according to claim 1, wherein,
when Pd_AVG is less than $Pd_{threshold}$, before activating the multi-split air conditioner to work in cooling mode, the method includes:
determining whether a current running frequency of the compressor f is less than a predetermined upper frequency limit fmax;
if f is greater than or equal to the predetermined upper frequency limit fmax, activating the multi-split air conditioner to work in cooling mode, stopping a fan within those indoor units which are powered on and entering into the cooling oil return process;
if f is less than the predetermined upper frequency limit fmax, maintaining the multi-split air conditioner working in heating mode and increasing the running frequency of the compressor to the upper frequency limit fmax;
determining whether an oil level of the compressor is greater than or equal to a set oil level;
if the oil level of the compressor is less than the set oil level, activating the multi-split air conditioner to work in cooling mode, stopping a fan within those indoor units which are powered on and entering into the cooling oil return process;
if the oil level of the compressor is greater than or equal to the set oil level, restoring the frequency of the compressor to the frequency f.

3. The method according to claim 1, wherein,
when the heating oil return process is beginning, the method further includes:
obtaining a current exhaust pressure of the compressor;
determining whether the current exhaust pressure is greater than a first set pressure value;
if the current exhaust pressure is greater than the first set pressure value, setting a time to which the heating oil return process lasts to equal a first set time;
if the current exhaust pressure is not greater than the first set pressure value, the time that the heating oil return process lasts is a second set time; wherein, the first set time is less than the second set time.

4. The method according to claim 1, wherein,
in the heating oil return process, the method further includes:
obtaining an oil level of the compressor;
determining whether the oil level is greater than or equal to a set oil level;
if the oil level is greater than or equal to a set oil level, ending the heating oil return process;
if the oil level is less than a set oil level, keeping the heating oil return process lasting.

5. The method according to claim 1, wherein,
in the heating oil return process, the method further includes:
increasing the opening degree of those expansion valves on the connecting pipes or increasing the frequency of the compressor;
restoring the opening degree of those expansion valves on the connecting pipes or the frequency of the compressor to the state before entering into the heating oil return process when the heating oil return process ending.

6. The method according to claim 1, wherein,
when the cooling oil return process beginning, the method further includes:
obtaining a current exhaust pressure of the compressor;
determining whether the current exhaust pressure is greater than a second set pressure value;
if the current exhaust pressure is greater than the second set pressure value, the time that the cooling oil return process lasts is a third set time;
if the current exhaust pressure is not greater than the second set pressure value, the time that the cooling oil return process lasts is a fourth set time; wherein the third set time is less than the fourth set time.

7. The method according to claim 1, wherein,
in the cooling oil return process, the method further includes:
increasing the running frequency of the compressor to an upper frequency limit;
detecting an oil level of the compressor and determining whether the oil level of the compressor is greater than or equal to a set the oil level;
if the oil level of the compressor is greater than or equal to the set the oil level, ending the cooling oil return process.

8. The method according to claim 1, wherein,
in the cooling oil return process, the method further includes:
reducing the opening degree of the expansion valves on the connecting pipes in connection with indoor units which are powered on and increasing the opening degree of those electronic expansion valves on the connecting pipes in connection with indoor units which are shut off.

9. The method according to claim 8, wherein:
reducing the opening degree of the expansion valves on the connecting pipes in connection with indoor units which are powered on to half of the opening degree of opening of the expansion vales when multi-split air conditioner is at heating mode, and increasing the opening degree of those electronic expansion valve on shut-off indoor units to its full opening degree.

* * * * *